Aug. 4, 1959 B. S. PARMET ET AL 2,898,400

TUNING SYSTEM

Filed June 16, 1955 2 Sheets-Sheet 1

INVENTORS.
Bernard S. Parmet
Frank L. Di Nardo

By: Mueller & Aichele Attys.

TUNING SYSTEM

Filed June 16, 1955 2 Sheets-Sheet 2

INVENTORS
Bernard S. Parmet
Frank L. Di Nardo
By Mueller & Aichele
Attys.

United States Patent Office 2,898,400

Patented Aug. 4, 1959

2,898,400

TUNING SYSTEM

Bernard S. Parmet, Elmwood Park, and Frank L. Di Nardo, Chicago, Ill., assignors to Motorola, Inc., Chicago, Ill., a corporation of Illinois Application June 16, 1955, Serial No. 515,917

8 Claims. (Cl. 178—5.8)

This invention relates generally to tuners for television receivers and more particularly to carrier responsive tuners which automatically tune the receivers to a television signal.

Tuners of the stop-on-carrier or signal-seeking type have been used with radio receivers to facilitate tuning the same to carrier waves present at the receiver which may have at least a predetermined signal strength. Such tuners include motor driving means which is stopped when the signal received produces a maximum response in the intermediate frequency amplifier of the receiver. These radio receivers have a relatively narrow band and receive a single carrier wave which is normally centered with respect to the band. In television receivers, however, the receiver must accept a very wide band and must receive two carriers, one for the video signal and one for the audio signal. Neither the video nor audio carrier is received at the center of the band for proper operation, and accordingly tuner control circuits, such as those used for radio applications are not suitable for television applications. The presence of two carriers poses a problem inasmuch as each carrier will provide a response as the tuner moves through the band and it is necessary to distinguish between the video and audio carriers.

It is, therefore, an object of the present invention to provide a tuner for television receivers which stops automatically when a signal is properly tuned in.

A further object of the invention is to provide a carrier responsive tuning control circuit providing a sharp trigger pulse when a television signal is properly tuned so that accurate tuner setting is provided.

A further object of the invention is to provide a circuit for controlling a tuner which distinguishes between the response from a video carrier wave and an audio carrier wave to thereby eliminate tuning ambiguity.

A feature of the invention is the provision of a carrier responsive circuit for controlling a television tuner which includes a high Q resonant circuit at the frequency of the video carrier in the intermediate frequency amplifier which produces a tuner control pulse when a received video carrier is properly positioned within the band pass of the intermediate frequency amplifier.

A further feature of the invention is the provision of a television receiver tuner including a carrier responsive circuit which produces a first response from the carrier wave in the intermediate frequency amplifier and a second response from the signal in the audio limiter with the first and second responses being combined differentially to provide a sharp trigger pulse for precise control.

Another feature of the invention is the provision of a tuner control circuit for a television receiver which produces a pulse when either the video or the audio carrier wave produce a predetermined frequency in the intermediate frequency amplifier, with gate means operated by the synchronization pulses of the receiver passing only a pulse produced by the video carrier.

Further objects, features and the attending advantages of the invention will be apparent from a consideration of the following description when taken in connection with the accompanying drawings, in which.

In accordance with the invention, a television receiver of the superheterodyne type includes tuning elements for selecting the received waves and converting the same to intermediate frequency. The tuning elements are controlled by a motor which, in turn, is controlled by a motor control circuit. The motor control circuit includes an amplifier coupled to the intermediate frequency amplifier of the receiver and having a high Q resonant circuit at the output thereof. This circuit is tuned to the predetermined frequency of the video intermediate frequency carrier wave when the receiver is tuned to a television signal. Accordingly, the resonant circuit produces maximum response at this frequency which response is rectified and combined with the voltage appearing at the limiter of the sound system. The voltage at the sound limiter is a minimum when the receiver is tuned to a signal and increases at frequencies on either side of the signal. By combining this voltage differentially with the voltage from the tuned circuit a sharpening effect is produced so that a very sharp pulse is available for controlling the tuning. The resonant circuit will respond, of course, to any carrier which reaches the predetermined frequency in the intermediate frequency amplifier and will respond to the sound carriers as well as the video carriers. To distinguish the video carriers, a gate is provided which is responsive to the pulses from the synchronization signal separator. This circuit operates to pass the trigger pulse when the synchronization signals are present indicating that the receiver is tuned to a video carrier wave. The trigger pulse operates a control tube to stop the motor so that the receiver remains tuned to a received signal.

Figure 1:
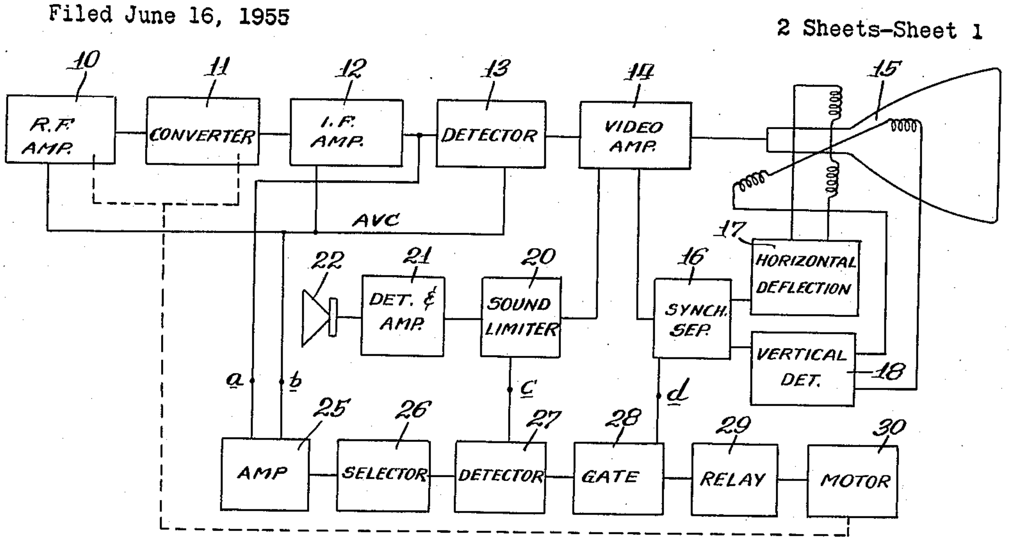
Fig. 1 is a block diagram of a television receiver including the tuner control circuit in accordance with the invention.

Referring now to the drawings, Fig. 1 illustrates a television receiver including the automatic tuning system in accordance with the invention. Received television signals are selected and amplified by a radio frequency amplifier 10 and applied to converter 11, which reduces the frequency thereof to intermediate frequency. Both the radio frequency amplifier 10 and the converter 11 include tuning elements which may be ganged together as indicated by the dotted lines. The intermediate frequency signals are amplified in intermediate frequency amplifier 12 and are detected in detector 13. In accordance with known practice, the detector may derive the video signal from the video intermediate frequency carrier wave and may heterodyne the video and sound intermediate frequency carrier waves to produce an intercarrier sound signal. The video signal and the intercarrier sound signal may be amplified in video amplifier 14 with the video signal then being applied to the cathode ray reproducing tube 15. The video signal is also applied to synchronization signal separator 16 which derives the synchronization pulses from the composite video signal. These pulses are applied from the separator 16 to the horizontal deflection system 17 and the vertical deflection system 18 which produce the sweep fields required for deflecting the beam.

The intercarrier sound signal is derived from the video amplifier 14 and applied to a sound limiter 20. The output of the limiter is applied to the detector which produces voice frequency signals which are amplified in audio amplifier 21 and reproduced in the loud speaker 22.

The components of Fig. 1 which have been described are standard components utilized in commercial television receivers. The components to be described provide a novel tuning system for causing the receiver to be tuned accurately to a received carried wave. These components include an amplifier 25 which receives the intermediate frequency signal from the output of the intermediate frequency amplifier 12. The gain of the amplifier 25 is controlled by the AVC voltage from the detector 13. This holds the output of the amplifier 25 at a substantially fixed level regardless of the strength of the received signal. The output of the amplifier 25 is applied to selector 26 which, as previously stated, is a high Q resonant circuit tuned to the frequency of the video carrier when the receiver is tuned to a television signal. The output of the selector 26 is applied to detector 27, which rectifies the response and combines the same with the voltage from the sound limiter 20. The limiter voltage is applied in opposition to the detected voltage to produce a sharp triggering pulse.

The triggering pulse from the detector circuit 27 is applied to gate 28 connected to synchronization signal separator 16 and which is opened only when synchronization pulses are applied thereto. Accordingly, trigger pulses produced by carriers other than a television carrier which produces synchronization pulses will not be passed through the gate 28. The pulses applied to gate 28 control relay 29 which in turn controls the motor 30. As shown by the dotted connection, the motor controls the tuning element of the radio frequency amplifier 10 and converter 11 to thereby select the signals applied to the intermediate frequency amplifier.

Figure 2:
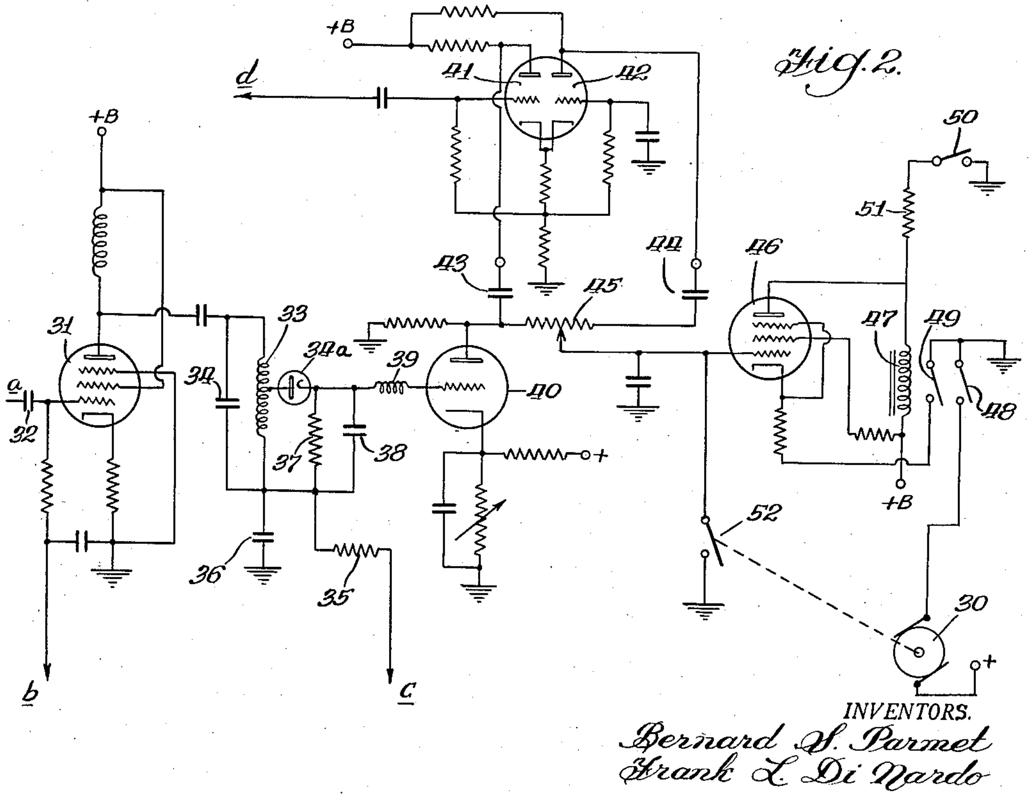
Fig. 2 is a detailed circuit diagram of the tuning control circuit.

Referring now more specifically to the control circuit shown in Fig. 2, the amplifier to which the intermediate frequency signal of the television receiver is applied includes a pentode amplifier tube 31. The input marked *a* is the input similarly marked in the system of Fig. 1. Signals from *a* are applied through condenser 32 to the control grid of the amplifier tube 31. In order to hold the output of the amplifier 31 at a highly constant value, the automatic gain control voltage from detector 13 is applied from point *b* to the amplifier 31. Since the amplifier 31 is at a point in the signal channel beyond the point from which the signal produces the AVC voltage, complete correction can be produced for changes in signal level so that the output of the amplifier 31 may be held precisely at a fixed value irrespective of the signal strength.

Figure 4:
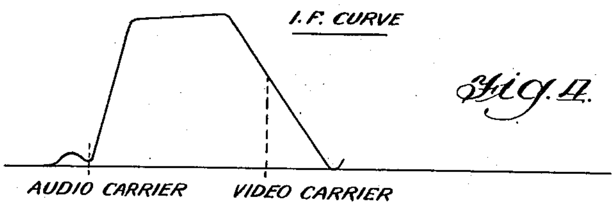
Fig. 4 shows the intermediate frequency response band of a television receiver.

The output of the amplifier 31 is applied to a high Q resonant circuit formed by coil 33 and condenser 34. This is tuned to the frequency of a video carrier wave passing through the intermediate frequency amplifier when the receiver is tuned to a television signal. In some present day receivers, the video intermediate frequency carrier wave has a frequency of 45.75 mc. This, however, depends upon the receiver design and other intermediate frequencies can be used. It is to be pointed out that the response of the intermediate frequency amplifier will not be a maximum when the video carrier is at the frequency specified. This is illustrated in Fig. 4 wherein the curve shows the intermediate frequency response of a typical television receiver, with the video carrier being at the half-power point of the response. Likewise, when properly tuned, the audio carrier is at a point having a substantially attenuated response with respect to the maximum response of the intermediate frequency amplifier.

Figure 5:
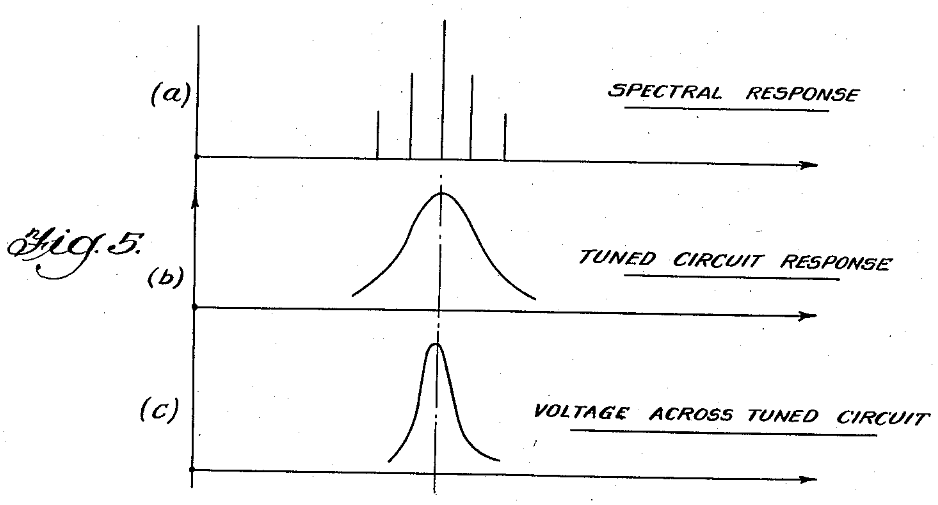
Fig. 5 illustrates the characteristics in the resonant circuit of the tuner control circuit.

Fig. 5 illustrates the operation of the tuned circuit with curve (*a*) showing the distribution of power in the video carrier, curve (*b*) showing the response of the tuned circuit, and curve (*c*) showing the voltage across the tuned circuit. Curve (*c*) may represent the alternating current response of the tuned circuit, or the rectified response produced by the diode 34*a* coupled to the inductor 33 of the tuned circuit. Accordingly, the response of the tuned circuit is a maximum when a carrier is received which produces a carrier of the predetermined frequency in the intermediate frequency amplifier. Of course, any signal within the band of the receiver will produce this frequency in the intermediate-frequency amplifier for some setting of the tuner.

Figure 6:
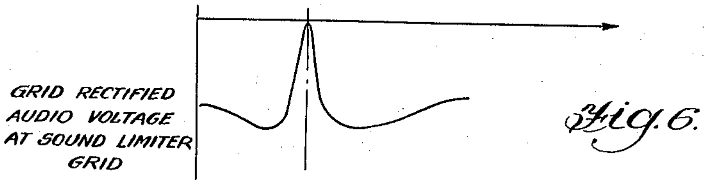
Fig. 6 illustrates the voltage derived from the sound limiter of the television receiver.
Figure 7:
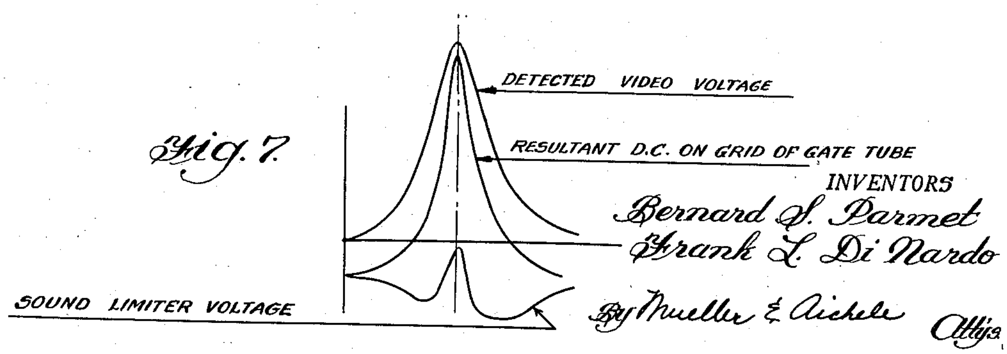
Fig. 7 illustrates the combined voltages which produce the trigger signal utilized in the tuner control system.

Referring back to Fig. 2, it will be noted that the voltage from the sound limiter from point *c* is applied through resistor 35 and across condenser 36 which is connected to the bottom terminal of the tuned circuit. Accordingly, the voltage at the sound limiter is combined with the rectified voltage, with the resulting voltage appearing across resistor 37 and condenser 38. This is illustrated in curves of Figs. 6 and 7, with the curve of Fig. 6 showing the voltage at the sound limiter which is applied at point *c*. This voltage is a minimum when the receiver is properly tuned, since the receiver includes traps at the audio intermediate frequency. This negative voltage from the limiter which is a minimum on frequency can be combined with the voltage across the tuned circuit to produce the trigger voltage. This is shown in Fig. 7 wherein the detected video voltage in combined with the sound limiter voltage to produce the resultant signal with is applied to the gating tube. It will be noted that the detected video voltage is substantially unattenuated at the center frequency and is attenuated on either side of the center frequency to thereby sharpen the combined voltage to produce a satisfactory trigger voltage for controlling the tuner.

Referring again to Fig. 2, the trigger voltage across resistor 37 and condenser 38 is applied through choke 39 to the gate tube 40. The gate tube 40 is controlled by synchronization pulses which are applied from point *d* to the grid of the triode tube 41. The triode tube 41 produces positive synchronization pulses at the plate thereof, and the triode 42 which is coupled to the triode 41 produces negative synchronization pulses at the plate thereof. The positive synchronization pulses are applied through condenser 43 to the plate of triode 40 to render this tube conducting when synchronization pulses are present. Accordingly, the trigger voltage is passed by the gate 40 when synchronization pulses are present, but is not passed under any other condition.

Figure 3:
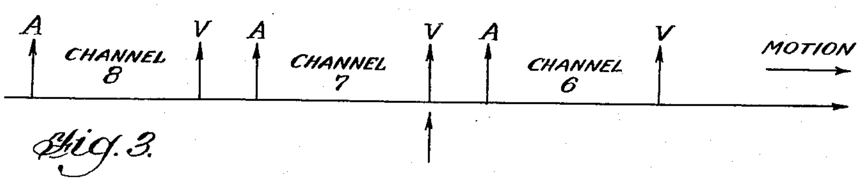
Fig. 3 illustrates the spectrum distribution of video and audio carrier waves of a plurality of television channels.

To consider the need for the gating tube 40, reference is made to Fig. 3 which shows the spectrum of a plurality of television channels. For example, these channels may be channels 6, 7, and 8 of the presently authorized television channels. It will be apparent that, as the tuning elements of the receiver are varied, the various audio and video carriers (marked A and V respectively) will move through the intermediate frequency response and will reach the frequency to which the high Q resonant circuit is tuned. Accordingly, a response will be produced by each video carrier wave and also by each audio carrier wave. It is, of course, not desired to stop the tuning when an audio carrier wave is received at this predetermined frequency and, accordingly, it is desired to block the application of the trigger pulse to the tuning relay, except when the video carrier is received. This operation is accomplished by the gate 40.

It is to be pointed out that the gate may be formed by mechanical blanking means connected to the tuner and blocking the trigger voltage except when the tuner setting is close to a television channel.

The output of the gate 40 is applied through resistor 45 to the relay tube 46. In order to keep the alternating current voltage applied to the plate of the gate tube 40 from appearing at the control grid of tube 46, without the use of a large filter condenser which would cause a delay of the trigger pulse, this alternating current voltage is balanced out by a bridge circuit. The bridge circuit includes the triode tube 42 previously mentioned, the plate of which is connected through condenser 44 to the resistor 45. The negative pulse applied through condenser 44 to resistor 45 balances out the positive pulse applied through condenser 43 to resistor 45 so that at the point thereon at which the trigger pulse is derived, only the direct current gating voltage is present.

The relay tube 46 includes a relay 47 in the output circuit thereof. The tube 46, when conducting, actuates the relay 47 and thereby closes contacts 48 and 49. Contacts 48 energize the motor 30 connected to the tuning elements and contacts 49 provide a ground for the relay tube 46. The positive trigger pulse applied to tube 40 becomes a negative voltage when conducted through the gate tube 40 and is effective to cut off the tube 46 when the receiver is tuned to a television signal. This releases the relay 47 so that the contacts 48 and 49 are opened and the motor 30 stops.

For initiating operation of the system, a switch 50 is connected through resistor 51 to the plate of the relay tube 46. It will be obvious that by closing this switch the relay will be actuated to close contacts 48 and cause the motor 30 to start. This will cause the tuner to move away from a station which may have been tuned in and thereby remove the trigger voltage from the relay tube. This tube will conduct since the cathode thereof is connected to ground and hold the motor in operative condition. When the next video carrier is received, the relay tube 46 will be cut off to stop the tuner so that the receiver will be tuned to the new carrier wave. When a station is tuned in, relay contacts 49 are open and tube 46 is inactivated so that incidental noise and manual fine tuning will not actuate motor 30.

The system as described above is satisfactory for use in a motor driven continuous tuner. Many television tuners are of the switch type wherein different tuning elements are switched in for the different channels and fine tuning is provided by a separate continuously variable vernier element. In such tuners the switch may be operated in steps and the vernier element moved between steps with both being driven by a single mechanical system such as a Geneva motion. In this arrangement false triggering signals resulting from transients produced by switching may be avoided by grounding the grid of relay tube 46 during switching by switch 52 connected to the mechanical system. The ground is removed during fine tuning to provide the desired tuning action.

It is, therefore, seen that an effective circuit for controlling the tuning of a television receiver has been provided. The system provides a tuning trigger pulse in response to a received carrier and applies the pulse to the tuner control relay only when it is produced by a video carrier wave. The pulse may be sharpened by the sound limiter voltage to provide a trigger voltage which produces highly accurate tuning.

What is claimed is:

1. An automatic tuning system for a television receiver for tuning the same to a received television signal including video and audio carrier waves at different frequencies, and which receiver includes tuning means for converting the received waves to intermediate frequency carrier waves of fixed frequencies, a wide band intermediate frequency amplifier coupled to the tuning means for amplifying video and audio intermediate frequency waves, a detector connected to the intermediate frequency amplifier, a sound limiter to which sound signals derived by the detector are applied, and a synchronization signal separator coupled to the detector; said system including in combination, a high Q resonant circuit tuned to the predetermined frequency of the video carrier wave in the intermediate frequency amplifier and developing a maximum voltage when the receiver is tuned to a television signal, means for applying waves from the intermediate frequency amplifier to said resonant circuit, circuit means coupled to the sound limiter of the receiver for deriving therefrom a voltage wave having a minimum when the receiver is tuned to a television signal and greater values at adjacent frequencies, said circuit means including a portion connected to said resonant circuit and combining the voltage developed thereby in response to a carrier wave of said predetermined frequency with said voltage wave to provide a trigger voltage when a carrier wave of said predetermined frequency is produced in the intermediate frequency amplifier, with said voltage wave reducing said voltage developed by said resonant circuit at frequencies spaced from said predetermined frequency so that said trigger voltage rises and falls sharply as the receiver is tuned to the frequency of a television signal, gate means coupled to the synchronization signal separator and having a portion providing a conductive path in response to the application of synchronization pulses thereto, tuning control means for controlling the operation of the tuning means, said gate means connecting said circuit means to said tuning control means for applying said trigger voltage through said conductive path to said control means when synchronization pulses are produced in the receiver, said tuning control means operating to stop the tuning means in response to said trigger voltage at the received television signal.

2. An automatic tuning system for a television receiver for tuning the same to a received television signal including video and audio carrier waves at different frequencies, and which receiver includes tuning means for converting the received waves to intermediate frequency carrier waves of fixed frequencies, an intermediate frequency amplifier coupled to the tuning means for amplifying video and audio intermediate frequency waves, a detector connected to the intermediate frequency amplifier, and a sound limiter to which sound signals derived by the detector are applied; said system including in combination, a high Q resonant circuit tuned to the predetermined frequency of the video carrier wave in the intermediate frequency amplifier and developing a maximum voltage when the receiver is tuned to a television signal, means for applying waves from the intermediate frequency amplifier to said resonant circuit, circuit means coupled to the sound limiter of the receiver for deriving therefrom a voltage wave having a minimum when the receiver is tuned to a television signal and greater values at adjacent frequencies, said circuit means including a portion connected to said resonant circuit and combining the voltage developed thereby in response to a carrier wave of said predetermined frequency with said voltage wave to provide a trigger voltage when a carrier wave of said predetermined frequency is produced in the intermediate frequency amplifier, with said voltage wave reducing said voltage developed by said resonant circuit at frequencies spaced from said predetermined frequency so that said trigger voltage rises and falls sharply as the receiver is tuned to the frequency of a television signal, gate means having a portion providing a conductive path when the receiver is tuned to a television signal, tuning control means for controlling the operation of the tuning means, said gate means connecting said circuit means to said tuning control means for applying said trigger voltage through said conductive path to said control means, said tuning control means operating to stop the tuning means in response to said trigger voltage at the received television signal.

3. An automatic tuning system for a television receiver for tuning the same to a received television signal including video and audio carrier waves at different frequencies, and which receiver includes tuning means for converting the received waves to intermediate frequency carrier waves of fixed frequencies, an intermediate frequency amplifier coupled to the tuning means for amplifying video and audio intermediate frequency waves, a detector connected to the intermediate frequency amplifier, a sound limiter to which sound signals derived by the detector are applied, and a synchronization signal separator coupled to the detector; said system including in combination circuit means including a high Q resonant circuit portion tuned to the predetermined frequency of the video carrier wave in the intermediate frequency amplifier and developing a maximum voltage when the receiver is tuned to a television signal, means for applying waves from the intermediate frequency amplifier to said resonant circuit, said circuit means including rectifier means for rectifying the waves developed in said resonant circuit portion in response to a carrier wave of said predetermined frequency to produce a voltage pulse, said circuit means also including a portion coupled to the sound limiter of the receiver for deriving therefrom a voltage wave having a minimum when the receiver is tuned to a television signal and greater values at adjacent frequencies, said circuit means combining said voltage pulse and said voltage wave with said voltage wave reducing the voltage pulse at frequencies spaced from said predetermined frequency to provide a sharp trigger voltage when a carrier wave of said predetermined frequency is produced in the intermediate frequency amplifier, gate means coupled to the synchronization signal separator and having a portion providing a conductive path in response to the application of synchronization pulses thereto, tuning control means for controlling the operation of the tuning means, said gate means connecting said circuit means to said tuning control means for applying said trigger voltage through said conductive path to said control means when synchronization pulses are produced in the receiver, said tuning control means operating to stop the tuning means in response to said trigger voltage at the received television signal.

4. An automatic tuning system for a television receiver for tuning the same to a received television signal including video and audio carrier waves at different frequencies, and which receiver includes tuning means for converting the received waves to intermediate frequency carrier waves of fixed frequencies, an intermediate frequency amplifier coupled to the tuning means for amplifying video and audio intermediate frequency waves, a detector connected to the intermediate frequency amplifier, a sound limiter to which sound signals derived by the detector are applied, and a synchronization signal separator coupled to the detector; said system including in combination, a high Q resonant circuit tuned to the predetermined frequency of the video carrier wave in the intermediate frequency amplifier and developing a maximum voltage when the receiver is tuned to a television signal, means for applying waves from the intermediate frequency amplifier to said resonant circuit, circuit means coupled to the sound limiter of the receiver for deriving therefrom a voltage wave having a minimum when the receiver is tuned to a television signal and greater values at adjacent frequencies, said circuit means including a portion connected to said resonant circuit and combining the voltage developed thereby with said voltage wave to provide a trigger voltage when a carrier wave of said predetermined frequency is produced in the intermediate frequency amplifier, with said voltage wave reducing said voltage developed by said resonant circuit at frequencies spaced from said predetermined frequency so that said trigger voltage forms a sharp pulse, gate means coupled to the synchronization signal separator including means for providing synchronization pulses of opposite polarity and a valve including input and output electrodes, means for applying said trigger voltage to said input electrode, resistance means having end terminals with one end terminal being connected to said output electrode, means for applying said synchronization pulses of opposite polarity to said end terminals of said resistance means with said synchronization pulses applied to said one terminal being of the polarity to render said valve conducting, tuning control means for controlling the operation of the tuning means, and means connecting said resistance means to said tuning control means for applying said trigger voltage to said control means when synchronization pulses are produced in the receiver, said tuning control means operating to stop the tuning means in response to said trigger voltage at the received television signal.

5. An automatic tuning system for a television receiver for tuning the same to a received television signal including video and audio carrier waves at different frequencies, and which receiver includes variable tuning means for converting the received waves to intermediate frequency carrier waves of fixed frequencies; said system including in combination, high Q resonant circuit means tuned to the predetermined frequency of the video carrier wave in the intermediate frequency amplifier when the receiver is tuned to a television signal, said resonant circuit means providing a trigger voltage when a wave of said predetermined frequency is applied thereto, means for applying intermediate frequency carrier waves to said resonant circuit means, gate means having a portion providing a conductive path, means for applying a portion of the received television signal to said gate means for rendering the path thereof conductive only when the receiver is tuned to a television signal, and tuning control means for controlling the operation of the tuning means, said gate means connecting said resonant circuit means to said tuning control means and applying said trigger voltage through said conductive path to said control means, said tuning control means operating to stop the tuning means at the received television signal in response to said trigger voltage.

6. An automatic tuning system for a television receiver for tuning the same to a received television signal including video and audio carrier waves at different frequencies, and which receiver includes variable tuning means for converting the received waves to intermediate frequency carrier waves of fixed frequencies, an intermediate frequency amplifier coupled to the tuning means for amplifying video and audio intermediate frequency waves, a detector connected to the intermediate frequency amplifier, and a synchronization signal separator coupled to the detector; said system including in combination, high Q resonant circuit means tuned to the predetermined frequency of the video carrier wave in the intermediate frequency amplifier when the receiver is tuned to a television signal, said resonant circuit means providing a trigger voltage when a wave of said predetermined frequency is applied thereto, means for applying waves from the intermediate frequency amplifier to said resonant circuit means, gate means coupled to the synchronization signal separator and having a portion providing a conductive path in response to the reception of synchronization pulses, tuning control means for controlling the operation of the tuning means, said gate means connecting said resonant circuit means to said tuning control means and applying said trigger voltage through said conductive path to said control means when synchronization pulses are produced in the receiver, said tuning control means operating to stop the tuning means at the received television signal in response to said trigger voltage.

7. An automatic tuning system for a television receiver for tuning the same to a received television signal including video and audio carrier waves at different frequencies, and which receiver includes variable tuning means for converting the received waves to intermediate frequency carrier waves of fixed frequencies, an intermediate frequency amplifier coupled to the tuning means for amplifying video and audio intermediate frequency waves, a detector connected to the intermediate frequency amplifier, and a synchronization signal separator coupled to the detector; said system including in combination, high Q resonant circuit means tuned to the predetermined frequency of the video carrier wave in the intermediate frequency amplifier when the receiver is tuned to a television signal, said resonant circuit means providing a trigger voltage when a wave of said predetermined frequency is applied thereto, means for applying waves from the intermediate frequency amplifier to said resonant circuit means, gate means coupled to the synchronization signal separator and including means producing synchronization pulses in opposite polarities and an electron valve having input and output electrodes, means connecting said resonant circuit means to said input electrode for applying said trigger voltage thereto, resistor means including end terminals and a movable tap with one end terminal connected to said output electrode of said valve, means for applying synchronization pulses of one polarity to said ouput electrode to render said valve conducting only when said synchronization pulses are applied, means for applying synchronization pulses of opposite polarity to the other end terminal of said resistor means, tuning control means for controlling the operation of the tuning means, and means connecting said movable tap of said resistor means to said tuning control means for applying said trigger voltage thereto when synchronization pulses are produced in the receiver, said tuning control means operating to stop the tuning means at the received television signal in response to said trigger voltage.

8. An automatic tuning system for a television receiver for tuning the same to a received television signal including video and audio carrier waves at different frequencies, and which receiver includes variable tuning means for converting the received waves to intermediate frequency carrier waves of fixed frequencies; said system including in combination, circuit means including a high Q resonant circuit portion tuned to the predetermined frequency of the video carrier wave in the intermediate frequency amplifier when the receiver is tuned to a television signal, means for applying intermediate frequency carrier waves to said resonant circuit portion, said resonant circuit portion selecting waves of said predetermined frequency, said circuit means including rectifier means connected to said resonant circuit portion for producing a voltage pulse from the selected waves, gate means having a portion providing a conductive path and a portion responsive to a received television signal for rendering such path conductive, tuning control means for controlling the operation of the tuning means, said gate means connecting said circuit means to said tuning control means and applying said voltage pulse through said conductive path to said control means, said tuning control means operating to stop the tuning means at the received television signal in response to said voltage pulse.

References Cited in the file of this patent

UNITED STATES PATENTS

| | | |
|---|---|---|
| 2,493,741 | Andrews | Jan. 10, 1950 |
| 2,501,003 | Pifer | Mar. 21, 1950 |

OTHER REFERENCES

"Rider's Television Manual," volume 4, Admiral, pp. 25, 26.